M. C. SLODERBECK.
AUTOMATIC DERAILER.
APPLICATION FILED OCT. 30, 1911.

1,062,192.

Patented May 20, 1913.
3 SHEETS—SHEET 1.

WITNESSES

INVENTOR
M. C. Sloderbeck
Attorney

M. C. SLODERBECK.
AUTOMATIC DERAILER.
APPLICATION FILED OCT. 30, 1911.
1,062,192.
Patented May 20, 1913.
3 SHEETS—SHEET 2.
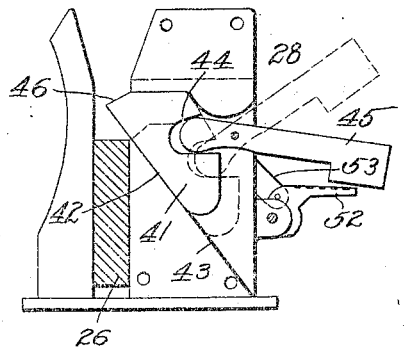
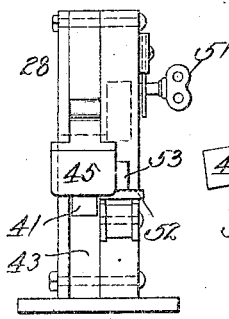
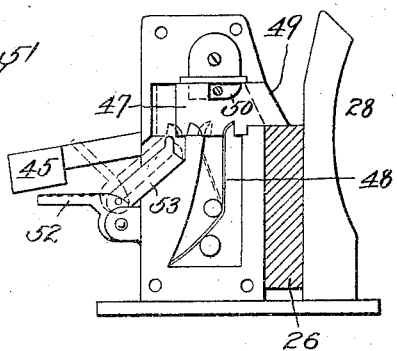
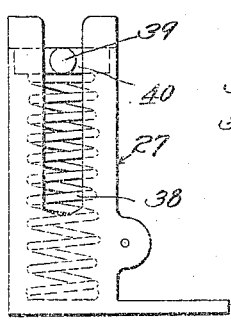
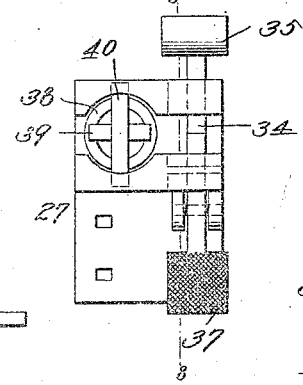
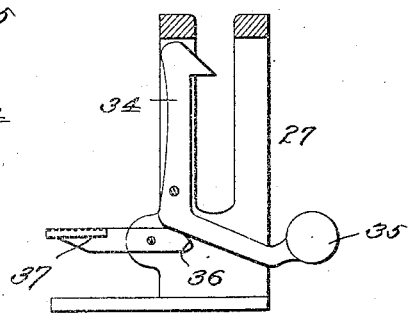
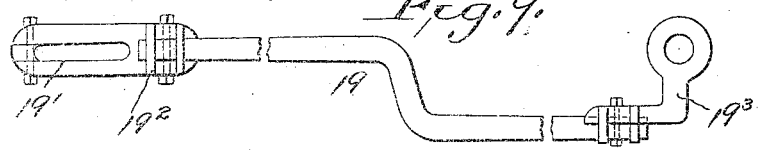
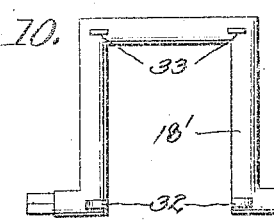
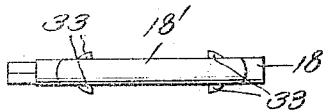
WITNESSES
M. C. Sloderbeck INVENTOR
Attorney M. C. SLODERBECK.
AUTOMATIC DERAILER.
APPLICATION FILED OCT. 30, 1911.
1,062,192.
Patented May 20, 1913.
3 SHEETS—SHEET 3.
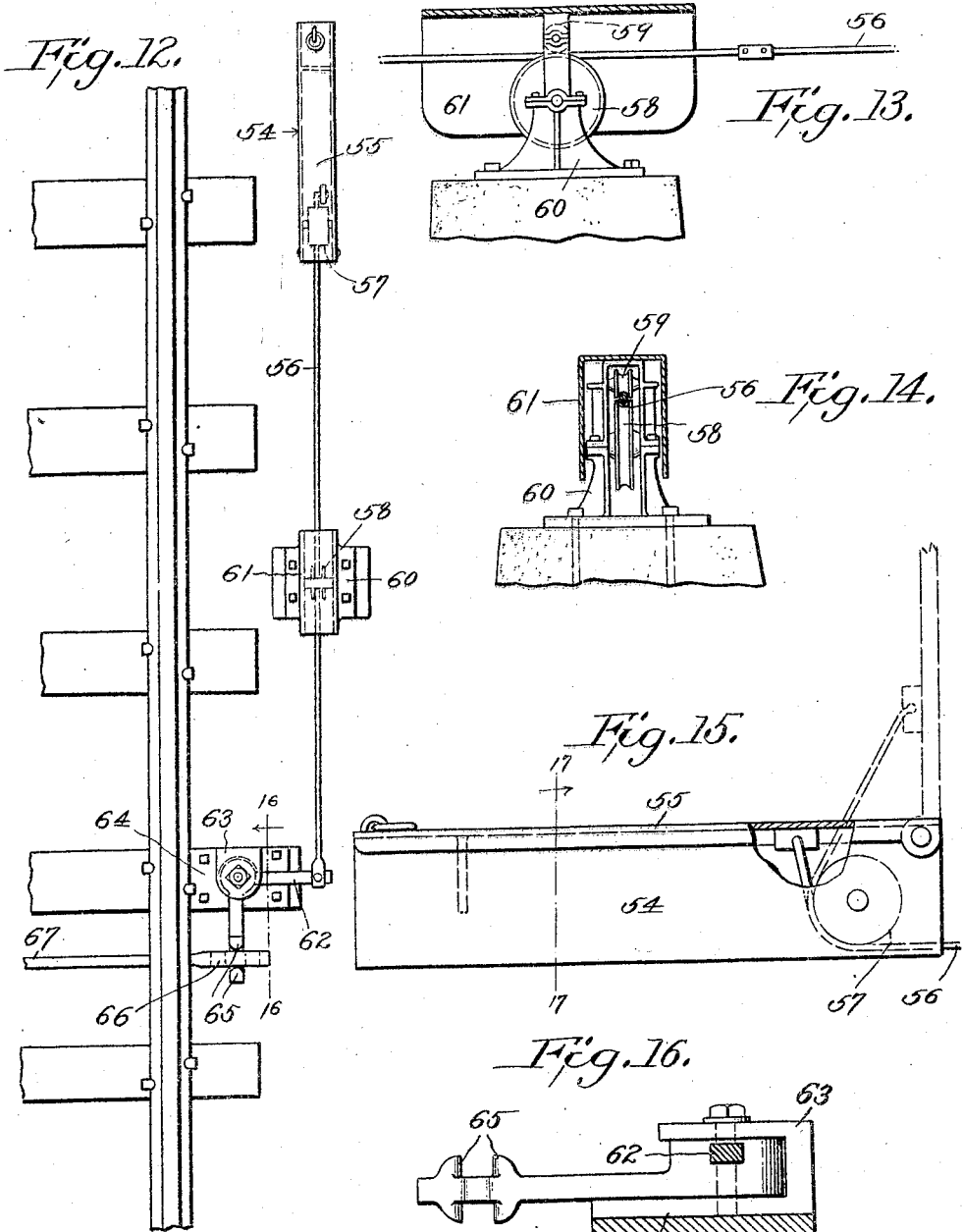
WITNESSES
M. C. Sloderbeck INVENTOR
E. B. Stocking
Attorney

UNITED STATES PATENT OFFICE.

MARTIN C. SLODERBECK, OF MARION, INDIANA, ASSIGNOR OF ONE-THIRD TO EDWARD E. LEAPLEY AND ONE-THIRD TO WILLIAM A. LEAPLEY, BOTH OF MARION, INDIANA.

AUTOMATIC DERAILER.

1,062,192.   Specification of Letters Patent.   Patented May 20, 1913.

Application filed October 30, 1911. Serial No. 357,689.

*To all whom it may concern:*

Be it known that I, MARTIN C. SLODERBECK, a citizen of the United States, residing at Marion, county of Grant, State of Indiana, have invented a certain new and useful Improved Automatic Derailer, of which the following is a specification, reference being had therein to the accompanying drawing.

This invention relates to certain new and useful improvements in automatic derailers and more particularly to that class of derailers as shown in my former Patents Nos. 873,622 and 974,715, the object being to improve the general construction of the derailer whereby a device is formed which is exceedingly strong and durable and one which will have many advantages over devices of this character now in use.

Another object of the invention is to provide a derailer which is capable of being automatically operated in one direction together with means for shifting the derailer into either of its adjusted positions and locking the same.

A further object of the invention is to improve the general construction of derailer block and to provide novel means for mounting the same in order to resist the end thrust caused by the car wheel against the block, together with means for guiding the block in its movement toward and from the track rail.

Another object is to provide mechanism for operating the derailer having an operating lever which is capable of being locked in either of its adjusted positions by locking devices, one of said locking devices having a positive lock and the other a non-positive lock, the non-positive lock being provided with means for throwing the lever toward the positive lock when released.

A further object is to provide a derailer which is capable of being operated by a ground throw through the medium of a cable whereby the same can be installed for tramway purposes.

Other and further objects and advantages of the invention will be hereinafter set forth and the novel features thereof defined by the appended claims.

Figure 1:
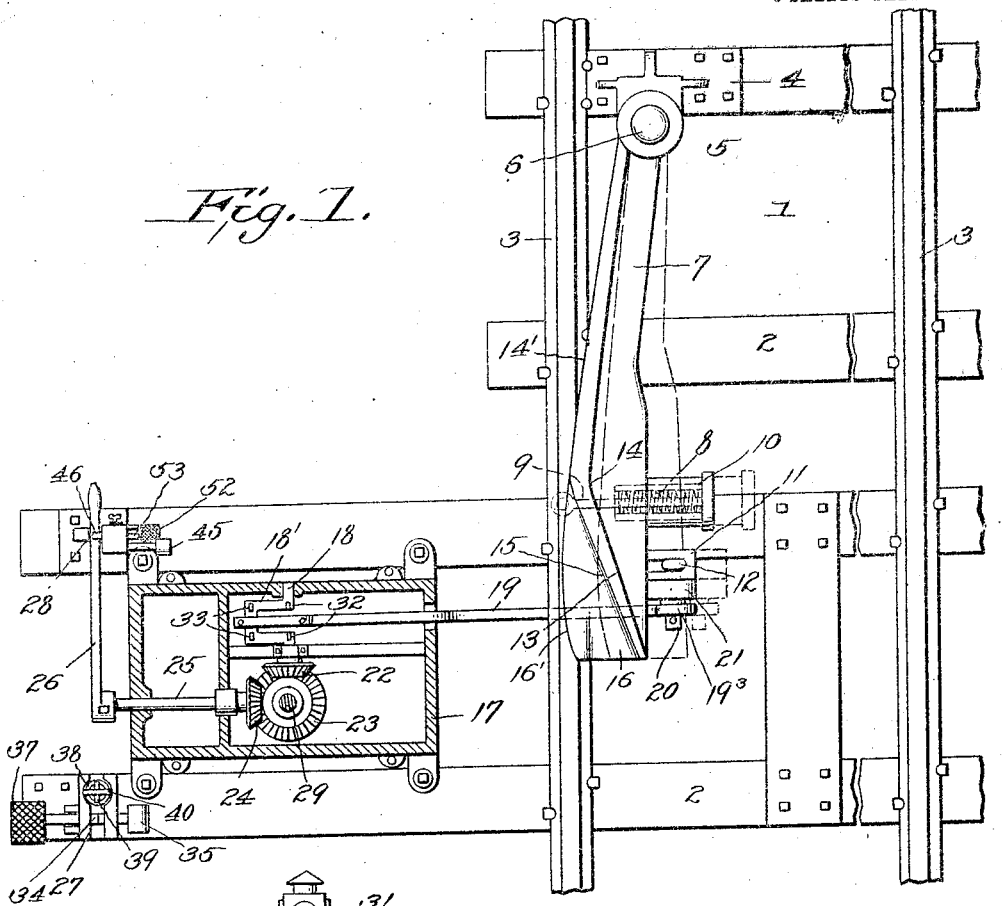
Figure 2:
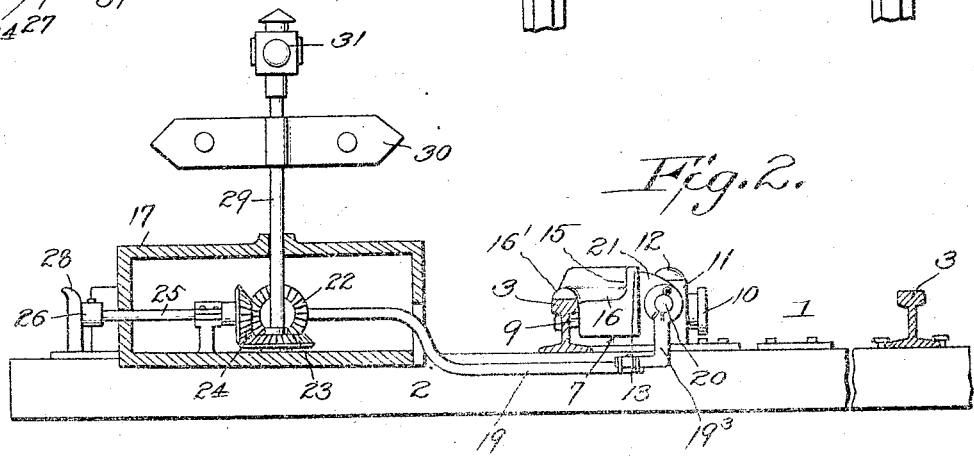

In the drawings—Figure 1 is a top plan view of my improved automatic derailer showing the application of the same, the casing inclosing the operating mechanism being shown in section; Fig. 2 is a transverse vertical section showing the derailer block in elevation; Fig. 3 is an end view of one of the lever locks showing the same in its different positions in dotted lines; Fig. 4 is a side elevation of the same; Fig. 5 is an end view showing the positive lock; Fig. 6 is an end view of a portion of the non-positive lock; Fig. 7 is a top plan view of the same; Fig. 8 is a section taken on line 8—8 of Fig. 7; Fig. 9 is an elevation of the operating rod detached; Fig. 10 is a plan view of the bell crank lever; Fig. 11 is an edge view of the same; Fig. 12 is a plan view of the operating mechanism used in connection with a derailer when placed on a tram-way; Fig. 13 is a section through one of the cable guides and housing; Fig. 14 is a transverse section through the same; Fig. 15 is a side elevation, partly in section, of the ground throw; Fig. 16 is a section taken on line 16—16 of Fig. 13; and Fig. 17 is a section taken on line 17—17 of Fig. 15.

Like numerals of reference refer to like parts in the several figures of the drawings.

In the drawings, 1 indicates a road bed constructed in the ordinary manner comprising ties 2 upon which the track rails 3 are secured in the usual manner. Mounted upon one of the ties 2 is a plate 4 which is secured in position thereon by spikes as clearly shown and said plate preferably extends under the adjacent track rail 3 and is provided with a bifurcated bearing 5 in which is arranged a vertical pin 6 upon which is pivotally mounted a derailing block 7 which is adapted to co-act with the adjacent rail for a purpose later described. The block 7 is held into engagement with the adjacent rail 3 by a coil spring 8 which surrounds a rod 9 connected to the adjacent rail and is inclosed by a casing 10 for protecting the same from the weather.

The lateral movement of the block 7 from its fulcrum point is guided by a laterally projecting slotted member 11 through which extends a bolt 12 carried by one of the ties, the movement of said block being limited by the rod 9 and the member 11. By this construction, the block is free to move away from the adjacent rail against the tension of the spring which allows the flange of the wheel, when traveling in one direction, to force the same out of the way. The derailer is provided with a vertical oblique flange 13 adjacent its free end which extends to a point 14 from which it substantially parallels the edge of the derailer and forms an inclined face 14' by means of which the derailer may be automatically opened when engaged by the flange of a car wheel. Extending at an angle to the inclined face and at the free end of the derailer, is a derailing face 15 which terminates in a downwardly curved face 16 which is provided with a lip 16' which normally rests upon the top of the adjacent rail and catches the face of the wheel in order to cause the same to ride upon the derailing face and to be guided off of the track.

Various forms of operating mechanism may be employed in connection with a derailer as clearly set forth and in Figs. 1 and 2, I show a lever operating the same through the medium of gears. The operating mechanism comprises a housing 17 in which is mounted a shaft 18 provided with a crank 18' carrying an operating rod 19, the free end of which is connected to a longitudinally projecting pin 20 carried by a laterally projecting lug 21 of the derailing block 7. The shaft 18 carries a beveled gear 22 which meshes with the beveled gear 23 which, in turn, meshes with the beveled gear 24 carried by the lever shaft 25 upon the free end of which is mounted a lever 26 which is adapted to co-act with a catch 27 and lock 28. The gear 23 is carried by a vertical post 29 upon the upper end of which is mounted a signal target 30 and a signal lantern 31 which are given a one-half revolution at each operation of the derailer.

The operating rod 19, is preferably formed of sections, comprising a central section and end sections, the end section 19' being provided with an elongated slot in which the crank is mounted, said section being connected to the main section by tongue and groove portions held interlocked by a bolt and provided with guides 19² as clearly shown. The opposite end is provided with an angle coupling section 19³ which is connected to the central section in a similar manner as the other end section. The crank 18' is provided with guide lugs 32 which prevent the operating bar from striking against the sharp corners and said operating bar is held in a central position upon the crank by lugs 33.

The catch lock 27 is provided with a vertical slot or guide-way to receive the operating lever 26 which is locked by a pivot latch member 34 having a weighted end 35 and adapted to be engaged by the curved end 36 of a treadle 37 for disengaging the latch member from the lever as it will be seen that when the treadle is pressed downwardly, the weighted end will be raised so as to swing the head of the latch member from over the lever, the weight normally having a tendency to hold the latch member in the position shown in Fig. 8. The latch being provided with a beveled head allows the same to be forced to one side of the slot when the lever is forced into the slot and after the same has passed the latch member, the weight returns the latch member to its normal position. The slot of the latch member terminates in an enlarged cylindrical portion in which a coil spring 38 is arranged, the upward movement of which is limited by cross-bars 39 carried by a plate 40 to which the upper end of the spring is connected and it will be seen that when the lever is forced into locked position, the spring is compressed so that when the treadle 37 is operated to throw the latch from over the lever, the upward movement of the spring will throw the lever 26 upwardly and toward the positive lock 28.

The lock 28 is provided with two compartments to one side of the slot to receive the lever and in one of these compartments a temporary lock is mounted and is especially adapted to be used when trains are being switched and comprises a bolt 41 having an oblique edge 42 which travels on an inclined face 43 and is provided with a notch 44 in which extends the rounded end of a weighted lever 45 which normally holds the bolt in an extended position in the slot. The bolt is provided with an oblique portion 46 adapted to be engaged by the lever when forced into the slot so as to force the bolt out of its path and it will be seen that after the lever has passed the bolt, the weight will return the bolt to a locked position. The other compartment of the lock 28 is provided with a sliding bolt 47 which is normally held in extended position across the slot by a spring 48 and is provided with an oblique portion 49 in order to allow the lever in its downward movement to force the bolt out of its path. The bolt is provided with a notch 50 adapted to receive the bit of a key 51 in order to allow the bolt to be withdrawn from over the lever by turning the key. I also provide means for locking the bolt 47 without the key which comprises a treadle 52 which carries a dog 53 adapted to co-act with a notch formed in the bolt 47 and it will be seen that by raising up on the treadle, the dog will be forced into engagement with the locking bolt and by exerting a downward pressure on the treadle, the dog will be drawn from locked position.

In Figs. 12 to 17, I show an operating mechanism especially constructed to be used in connection with a derailer when placed on a tram-way and in these figures, I show a ground throw comprising a casing 54 having a hinged lid 55 forming the operating lever to which one end of a cable 56 is connected which passes over a pulley 57 mounted within the casing 54 between guide pulleys 58 and 59 mounted in a suitable support 60 and inclosed by a casing 61. The free end of the cable is connected to one of the arms of a crank 62 which is mounted in a suitable bearing 63 of a plate 64 which is fixed upon the end of one of the ties, the other end of the crank arm being provided with spaced oppositely disposed lugs 65 forming a bearing for the slotted end 66 of an operating rod 67 which is connected to the derailer, not shown. The slotted end 66 of the operating rod 67 is provided with a closing block, not shown, and by this construction, the operating rod is allowed free movement within the bearing of the crank arm.

I have provided means for mounting the block and operating the same whereby the derailer can be moved into an operative or inoperative position by simply shifting the lever from the positive to the non-positive lock.

Having described my invention and set forth its merits what I claim and desire to secure by Letters Patent is—

1. The combination with a derailer, of a mechanism for shifting the same, an oscillating lever for operating said mechanism, a lock and a catch adapted to be engaged by said lever, said catch being provided with means for throwing the lever toward the lock when released.

2. In a derailer, the combination with a spring-actuated derailing block, of a mechanism for operating said block, an oscillating lever for operating said mechanism, a lock arranged in the path of travel of said lever to one side, a catch arranged in the path of travel to the other side, and means carried by said catch for throwing the lever into engagement with the lock when released thereby.

3. In a derailer, the combination with a pivoted derailing block, of mechanism for operating said block, an oscillating lever for operating said mechanism, a catch arranged in the path of travel of said lever and a spring carried by said catch for forcing said oscillating lever upwardly when released by said catch.

4. In a derailer, the combination with a pivoted spring-actuated derailing block, of mechanism for operating said block, a lever for operating said mechanism, a catch arranged in the path of travel of said lever, and a spring adapted to be engaged and compressed by said lever when in locked position, whereby said lever will be thrown upwardly when released.

In testimony whereof I affix my signature in presence of two witnesses.

MARTIN C. SLODERBECK.

Witnesses:
J. S. SISSON,
H. H. HAMAKER.